United States Patent [19]
Ohga et al.

[11] Patent Number: 5,685,889
[45] Date of Patent: Nov. 11, 1997

[54] METHOD FOR FLAME ABRASION OF GLASS PREFORM

[75] Inventors: Yuichi Ohga; Toshio Danzuka, both of Yokohama, Japan

[73] Assignee: Sumitomo Electric Industries, Ltd., Japan

[21] Appl. No.: 227,996

[22] Filed: Apr. 15, 1994

Related U.S. Application Data

[63] Continuation of Ser. No. 899,861, Jun. 17, 1992, abandoned.

[30] Foreign Application Priority Data

Jun. 20, 1991 [JP] Japan ................................. 3-148609

[51] Int. Cl.$^6$ ................................................ C03B 37/012
[52] U.S. Cl. ..................... 65/384; 65/385; 65/429; 65/120
[58] Field of Search .................. 65/2, 3.11, 3.12, 65/61, 65, 104, 376, 429, 120, 385, 384

[56] References Cited

U.S. PATENT DOCUMENTS

| | | | |
|---|---|---|---|
| 3,753,840 | 8/1973 | Plumat | 65/102 |
| 3,801,423 | 4/1974 | Van Laethem | |
| 3,811,857 | 5/1974 | Deeg et al. | 65/104 X |
| 4,491,463 | 1/1985 | Weinstein et al. | 65/2 |
| 4,854,956 | 8/1989 | Pluijms et al. | 65/2 |
| 5,086,352 | 2/1992 | Yamagata | 65/399 |
| 5,192,350 | 3/1993 | Le Sergent | 65/385 |

FOREIGN PATENT DOCUMENTS

| | | |
|---|---|---|
| 0087793 | 9/1983 | European Pat. Off. . |
| 0432791 | 6/1991 | European Pat. Off. . |
| 2589461 | 5/1984 | France . |
| 63-035431 | 2/1988 | Japan . |
| 1096040 | 4/1989 | Japan . |
| 2258643 | 10/1990 | Japan . |
| 8200635 | 3/1982 | WIPO . |

OTHER PUBLICATIONS

English Translation of SU 814,910 Mar. 1981.
English Translation of SU 775,057 Nov. 1990.
Database WPIL, Section Ch, Week 30, Derwent Publications, Ltd., London, GB; Class L01, AN 83-720693 & JP-A-58 104 034 (Sumitomo Electric IND.KK) 21 Jun. 1983 *abstract*.
Database WPIL, Section Ch, Week 28, Derwent Publications Ltd., London, GB; Class L01, AN 81-51370D & SU-A-0775 057 (Gusev Glass Institute) Nov. 1980 *abstract*.
Database WPIL, Section Ch, Week 52, Derwent Publications Ltd., London, GB; Class L01, AN 81-96480D & SU-A-0814910 (Dyatkovo Crys. Glass) 23 Mar. 1981 *abstract*.

*Primary Examiner*—John Hoffmann
*Attorney, Agent, or Firm*—Cushman Darby & Cushman Intellectual Property Group of Pillsbury Madison & Sutro, LLP

[57] ABSTRACT

An optical fiber glass preform is preheated so that it is uniformly preheated therethrough, then a surface of the preform is abraded by an oxyhydrogen flame to obtain a smooth optical fiber glass preform. This method is advantageous when relatively larger diameter preforms are treated in this manner because the step of uniformly preheating the preform reduces or eliminates a temperature differential therein. The temperature differential could otherwise cause the preform to crack during cooling.

2 Claims, 2 Drawing Sheets

METHOD FOR FLAME ABRASION OF GLASS PREFORM

This is a continuation of application Ser. No. 07/899,861, filed on Jun. 17, 1992, which is abandoned.

BACKGROUND OF THE INVENTION

1. Field of the invention

The present invention relates to a method for flame abrasion of a glass preform so as to provide a glass preform suitable for the preparation of an optical fiber.

2. Description of related art

Hitherto, a VAD (Vapor Phase Axial Deposition) method has been known for preparing an optical fiber. FIG. 1 is a schematic view of the VAD method. $SiO_2$ glass fine particles 5 which are produced in a oxyhydrogen flame 7 of burner 6 are deposited on a rotating start member 8 such as a glass rod so as to prepare a cylindrical porous preform. Then, the porous preform is sintered to prepare a transparent glass fiber preform.

The transparent glass preform thus prepared has roughness of several micrometers on its surface. Therefore, the preform surface is smoothed by a flame abrasion with an oxyhydrogen flame immediately before the drawing, and then the preform is drawn to prepare an optical fiber. FIG. 2 is a schematic view of the flame abrasion method. The surface of the rotating glass preform 1 is subjected to a flame abrasion with oxyhydrogen flame of plural burners 4.

Recently, the glass preform increasingly has a large dimension, namely a large diameter and a large length so as to decrease the cost of the optical fiber. When the glass preform has the large diameter, a center part of the preform cannot be sufficiently heated only by heat of the oxyhydrogen flame during the flame abrasion, and a large temperature difference is created between the center part and the surface part of the preform to cause a thermal strain. Because of this strain, the preform often cracks during the cooling.

SUMMARY OF THE INVENTION

An object of the present invention is to provide a method for flame abrasion of the preform surface with oxyhydrogen flame, in which a crack due to the thermal strain is prevented by reducing the temperature difference between the center part and the surface part of the preform.

This and other objects of the present invention are achieved by a method for flame abrasion of a surface of a glass preform using oxyhydrogen flame, which comprises preheating the glass preform and then subjecting the glass preform to the flame abrasion.

DETAILED DESCRIPTION OF THE INVENTION

An oxyhydrogen burner used for the flame abrasion has so weak thermal power that only a glass surface is subjected to a flame abrasion. When the glass preform having a large diameter of at least 50 mm is subjected to the flame abrasion, the thermal power of the oxyhydrogen flame is insufficient to heat the center part of the preform, and large temperature difference is created between the center part and the surface part of the preform so as to cause a thermal strain.

In the present invention, the preform is preheated prior to the flame abrasion so that the thermal difference is reduced to restrain the thermal strain and the cracking during the cooling after the flame abrasion is prevented. According to the present invention, the decrease of a yield due to the cracking is prevented even in the case of the glass preform having the large diameter of at least 50 mm, and the productivity of the optical fiber is significantly improved.

Figure 1:
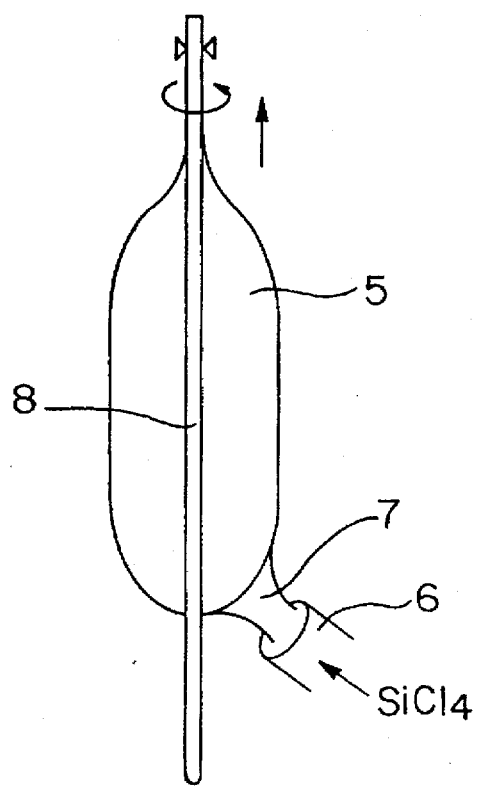
FIG. 1 is a schematic view of a VAD method.
Figure 2:
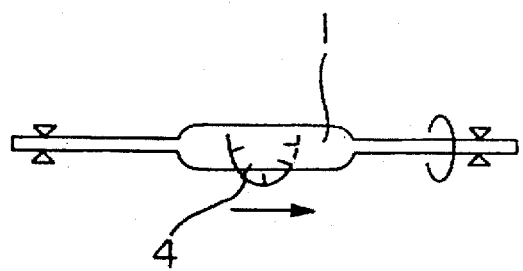
FIG. 2 is a schematic view of a conventional flame abrasion method.
Figure 3:
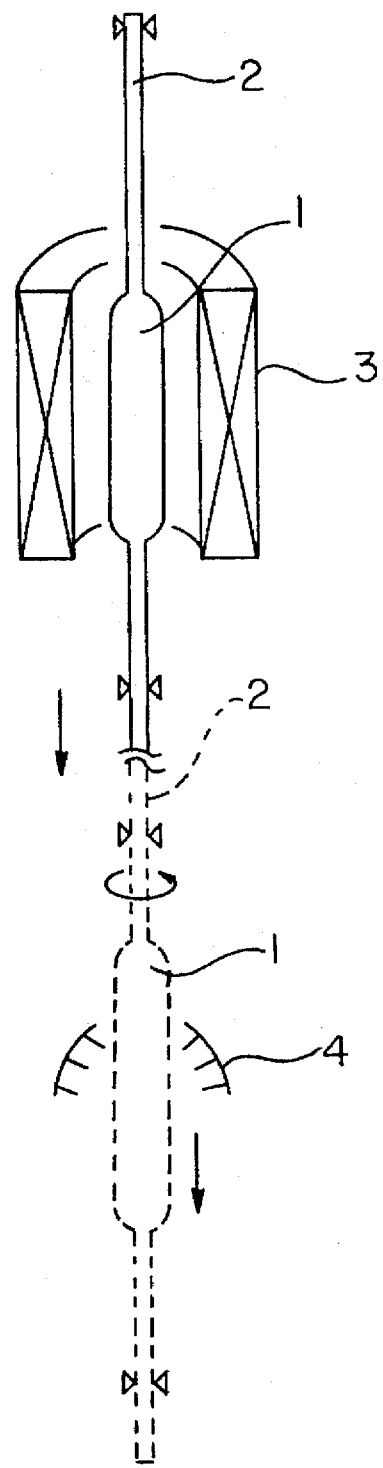
FIG. 3 is a schematic view showing one embodiment of a method for flame abrasion according to the present invention.

FIG. 3 is a schematic view showing one embodiment of the flame abrasion according to the present invention.

Both ends of a glass preform 1 are attached to supporting rods 2 and preheated in a heating oven 3. Then, the preform is transferred near an underneath oxyhydrogen flame burner 4 and treated with the oxyhydrogen flame to smooth the preform surface as shown in dotted lines.

The heating oven may be any oven provided that it can provide heat necessary for preheating the preform. The heating oven may be a resistance heating oven such as an oven having a carbon heater, a microwave oven or a high frequency oven. Preferably, the preform is preheated to a temperature of from 800° to 1400° C., more preferably from 1000° to 1200° C., for a time of from 20 to 180 min., more preferably from 30 to 120 min.

Although the oxyhydrogen flame burner is present under the heating oven in FIG. 3, the position of the burner to the oven is not limited to FIG. 3. The preheating and the flame abrasion may be conducted in separate apparatuses provided that the flame abrasion can be conducted while the glass preform is hot. The preform may be vertically or horizontally positioned.

PREFERRED EMBODIMENT OF THE INVENTION

The present invention will be illustrated by the following Example.

EXAMPLE

A preform for an optical fiber was prepared by a VAD method. $SiO_2$ glass fine particles were deposited on a rotating quartz rod having a diameter of 30 mm to make a layer having a thickness of 250 mm and a length of 600 mm, then the rod was heated for sintering in a vacuum oven to 1600° C. to prepare a transparent preform for an optical fiber having a diameter of 120 mm and a length of 600 mm.

A surface roughness of this preform was measured by a contact surface roughness meter, and was from 3 to 5 μm.

Supporting rods having a diameter of 40 mm were connected with both ends of the preform. A temperature of a resistance heating oven having a carbon heater was set at 1200° C. and the preform was preheated in the oven under a nitrogen atmosphere for one hour as shown in FIG. 3.

The preheated preform was transferred downward to a position near a burner. A flame abrasion was conducted with oxyhydrogen flame while the preform was hot. In an oxyhydrogen gas, a hydrogen gas flow rate was 120 l/min. and an oxygen gas flow rate was 60 l/min. While maintaining a distance between the preform and the burner at 50 mm, fixing the burner and transferring the preform at a velocity of 10 mm/min. with rotating the preform, the flame abrasion treatment was conducted. Then, the burner was turned off and the preform was cooled to the room temperature.

A surface roughness of the resultant preform was measured by the surface roughness meter, and was decreased to 0.5 µm.

Then, the preform was drawn to prepare an optical fiber having a diameter of 12.5 µm. The fiber could be continuously prepared without breakage of the fiber during the drawing. The optical fiber had a sufficient pulling strength at break of 7 kg.

COMPARATIVE EXAMPLE

The same manner in the Example was repeated except that the preheating was omitted. Since linear cracks were formed on the preform surface during the cooling after the flame abrasion, the preform could not be drawn.

What is claimed is:

1. A method for smoothing a surface of solid optical fiber glass preform having an exterior surface, a peripheral portion and an interior portion, comprising the steps of:

preheating the optical fiber glass preform, including the interior portion thereof, in a heating oven between 20 to 180 minutes to a temperature between 800° C. and 1400° C., and smoothing the surface of the preheated optical fiber glass preform by impinging an oxyhydrogen flame thereon while the preheated optical fiber glass preform is still hot from said preheating step, wherein the optical fiber glass preform has an initial diameter of at least about 50 mm prior to said steps of preheating the optical fiber glass preform and smoothing the surface of the optical fiber glass preform.

2. The method according to claim 1, wherein said preheating is in a heating oven.

* * * * *

UNITED STATES PATENT AND TRADEMARK OFFICE
CERTIFICATE OF CORRECTION

PATENT NO.   : 5,685,889
DATED        : November 11, 1997
INVENTOR(S)  : Yuichi OHGA, et al It is certified that error appears in the above-identified patent and that said Letters Patent is hereby corrected as shown below:

Column 4, line 2, Claim 1, delete "in a heating oven".

Signed and Sealed this

Fifth Day of January, 1999

Attest:

Attesting Officer

*Acting Commissioner of Patents and Trademarks*